US012634855B2

(12) United States Patent
Kim et al.

(10) Patent No.: US 12,634,855 B2
(45) Date of Patent: **\*May 19, 2026**

(54) METHOD FOR TRANSMITTING/RECEIVING SYNCHRONIZATION SIGNAL FOR D2D COMMUNICATION IN WIRELESS COMMUNICATION SYSTEM, AND APPARATUS THEREFOR

(71) Applicant: LG ELECTRONICS INC., Seoul (KR)

(72) Inventors: Hakseong Kim, Seoul (KR); Inkwon Seo, Seoul (KR); Hanbyul Seo, Seoul (KR); Daewon Seo, Seoul (KR); Youngtae Kim, Seoul (KR); Hyukjin Chae, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 193 days.

This patent is subject to a terminal disclaimer.

(21) Appl. No.: 18/656,124

(22) Filed: May 6, 2024

(65) Prior Publication Data

US 2024/0298280 A1     Sep. 5, 2024

Related U.S. Application Data

(63) Continuation of application No. 18/152,692, filed on Jan. 10, 2023, now Pat. No. 12,010,640, which is a (Continued)

(51) Int. Cl.
*H04W 56/00*      (2009.01)
*H04L 5/00*       (2006.01)
(Continued)

(52) U.S. Cl.
CPC ....... *H04W 56/0015* (2013.01); *H04L 5/0048* (2013.01); *H04L 5/0051* (2013.01);
(Continued)

(58) Field of Classification Search
CPC . H04L 5/0053; H04L 27/2613; H04L 5/0048; H04L 27/2692; H04L 27/26035;
(Continued)

(56) References Cited

U.S. PATENT DOCUMENTS

2015/0326362 A1\*  11/2015  Xiong ................... H04W 76/10
                                                          370/336
2016/0234045 A1\*   8/2016  Lindoff ............. H04L 25/03866

FOREIGN PATENT DOCUMENTS

WO      WO 2013125843 A1 \*  8/2013

\* cited by examiner

*Primary Examiner* — Phong La

(74) *Attorney, Agent, or Firm* — LEE, HONG, DEGERMAN, KANG & WAIMEY

(57)      ABSTRACT

The present invention relates to a method and an apparatus which enable a terminal to transmit a signal for device-to-device (D2D) communication in a wireless communication system. Specifically, the present invention transmits a synchronization signal for D2D communication and a demodulation reference signal (DM-RS) for demodulation of the synchronization signal, wherein the base sequence of the demodulation reference signal is generated using a synchronization reference ID.

17 Claims, 16 Drawing Sheets

D2DSS period

| Sync #0 | Sync #1 | Other resources (for D2D and / or cellular) | Sync #0 | Sync #1 | Other resources (for D2D and / or cellular) |

Related U.S. Application Data continuation of application No. 17/246,175, filed on Apr. 30, 2021, now Pat. No. 11,570,735, which is a continuation of application No. 16/528,162, filed on Jul. 31, 2019, now Pat. No. 11,026,200, which is a continuation of application No. 15/118,842, filed as application No. PCT/KR2015/001475 on Feb. 13, 2015, now Pat. No. 10,420,050.

(60) Provisional application No. 62/081,557, filed on Nov. 18, 2014, provisional application No. 62/079,553, filed on Nov. 14, 2014, provisional application No. 62/063,381, filed on Oct. 13, 2014, provisional application No. 61/990,089, filed on May 7, 2014, provisional application No. 61/977,598, filed on Apr. 9, 2014, provisional application No. 61/939,714, filed on Feb. 13, 2014.

(51) Int. Cl.
　　*H04L 27/26*　　　　　(2006.01)
　　*H04W 76/14*　　　　　(2018.01)

(52) U.S. Cl.
　　CPC ...... *H04L 5/0053* (2013.01); *H04L 27/26035* (2021.01); *H04L 27/2613* (2013.01); *H04L 27/2692* (2013.01); *H04W 76/14* (2018.02)

(58) Field of Classification Search
　　CPC .. H04L 5/0051; H04W 76/14; H04W 56/0015
　　See application file for complete search history.

E-UMTS (a) Control-Plane Protocol Stack (b) User-Plane Protocol Stack

Figure 14:
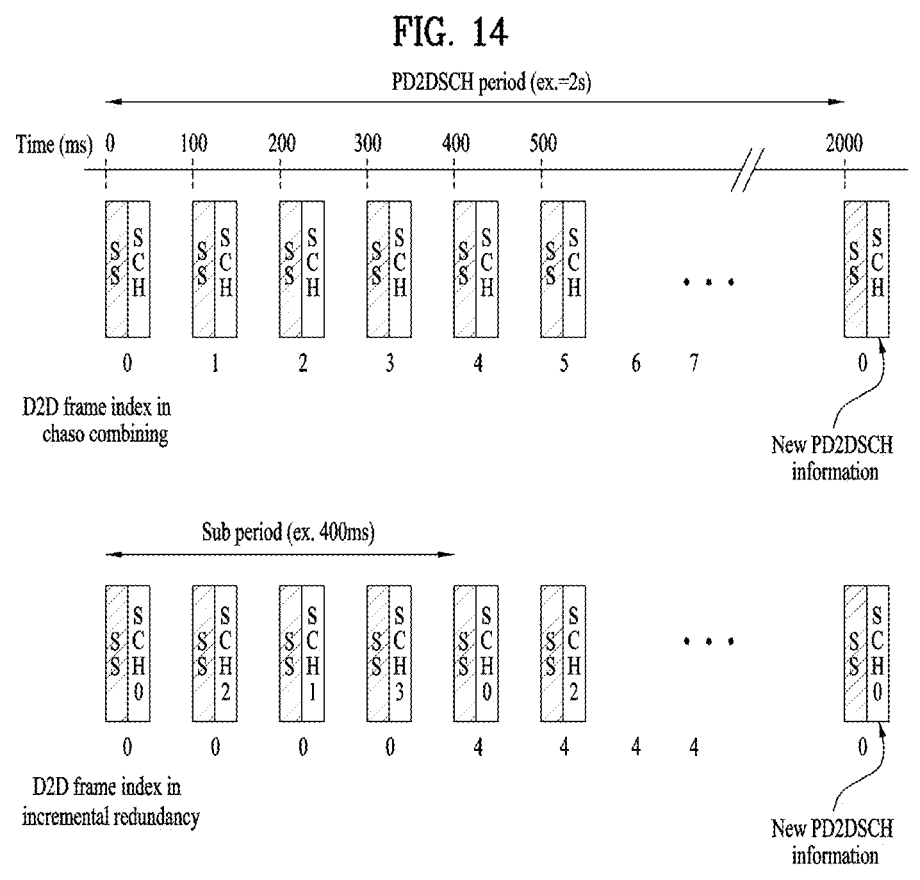

PD2DSCH period (ex.=2s)

Time (ms) 0    100    200    300    400    500    2000

| | | | | | | | | |
|---|---|---|---|---|---|---|---|---|
| S S | S C H | S S | S C H | S S | S C H | S S | S C H | S S | S C H | S S | S C H | S S | S C H |

0    1    2    3    4    5    6    7    0

D2D frame index in
chaso combining

New PD2DSCH
information

Sub period (ex. 400ms)

| S S S | S C H 0 | S S S | S C H 2 | S S S | S C H 1 | S S S | S C H 3 | S S S | S C H 0 | S S S | S C H 2 | S S S | S C H 0 |

0    0    0    0    4    4    4    4    0

D2D frame index in
incremental redundancy

New PD2DSCH
information

| D2DSS period | | | | | |
|---|---|---|---|---|---|
| Sync #0 | Sync #1 | Other resources (for D2D and / or cellular) | Sync #0 | Sync #1 | Other resources (for D2D and / or cellular) |

METHOD FOR TRANSMITTING/RECEIVING SYNCHRONIZATION SIGNAL FOR D2D COMMUNICATION IN WIRELESS COMMUNICATION SYSTEM, AND APPARATUS THEREFOR

CROSS-REFERENCE TO RELATED APPLICATIONS

This application is a continuation of U.S. patent application Ser. No. 18/152,692, filed on Jan. 10, 2023, which is a continuation of U.S. patent application Ser. No. 17/246,175, filed on Apr. 30, 2021, now U.S. Pat. No. 11,570,735, which is a continuation of U.S. patent application Ser. No. 16/528,162, filed on Jul. 31, 2019, now U.S. Pat. No. 11,026,200, which is a continuation of U.S. patent application Ser. No. 15/118,842, filed on Aug. 12, 2016, now U.S. Pat. No. 10,420,050, which is the National Stage filing under 35 U.S.C. 371 of International Application No. PCT/KR2015/001475, filed on Feb. 13, 2015, which claims the benefit of U.S. Provisional Application Nos. 61/939,714, filed on Feb. 13, 2014, 61/977,598, filed on Apr. 9, 2014, 61/990,089, filed on May 7, 2014, 62/063,381, filed on Oct. 13, 2014, 62/079,553, filed on Nov. 14, 2014, and 62/081,557, filed on Nov. 18, 2014, the contents of which are all hereby incorporated by reference herein in their entirety.

TECHNICAL FIELD

The present invention relates to a wireless communication system and, more particularly, to a method of transmitting and receiving a synchronization signal for device-to-device (D2D) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (cNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention is to provide a method of transmitting and receiving a synchronization signal for D2D communication in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solution

According to an aspect of the present invention devised to solve the above problems, a method of transmitting a signal for device-to-device (D2D) communication by a user equipment (UE) in a wireless communication system includes transmitting a synchronization signal for D2D communication and a demodulation reference signal (DM-RS) for demodulating the synchronization signal, wherein a base sequence of the DM-RS is generated using a synchronization reference identity (ID).

The base sequence may be generated based on a value obtained by dividing the synchronization reference ID by a predetermined value.

An orthogonal cover code (OCC) for the DM-RS may be determined using one lower bit of the synchronization reference ID.

A cyclic shift for the DM-RS may be determined using three lower bits of the synchronization reference ID.

According to another aspect of the present invention, a user equipment (UE) for transmitting a signal for device-to-device (D2D) communication in a wireless communication system includes a radio frequency (RF) unit and a processor, wherein the processor is configured to transmit a synchronization signal for D2D communication and a demodulation reference signal (DM-RS) for demodulating the synchronization signal, and wherein a base sequence of the DM-RS is generated using a synchronization reference identity (ID).

Advantageous Effects

According to the present invention, synchronization signal transmission and reception can be efficiently performed in a wireless communication system.

Effects according to the present invention are not limited to what has been particularly described hereinabove and other advantages not described herein will be more clearly understood by persons skilled in the art from the following detailed description of the present invention. That is, unintended effects of the present invention may also be derived by those skilled in the art from the embodiments of the present invention.

DESCRIPTION OF DRAWING

The accompanying drawings, which are included to provide a further understanding of the invention, illustrate embodiments of the invention and together with the description serve to explain the principle of the invention.

FIG. 4 is a diagram illustrating a structure of a radio frame used in an LTE system.

FIG. 14 is a diagram referenced to explain a method of indicating a frame number varying with whether an RV is present according to the present invention.

BEST MODE

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
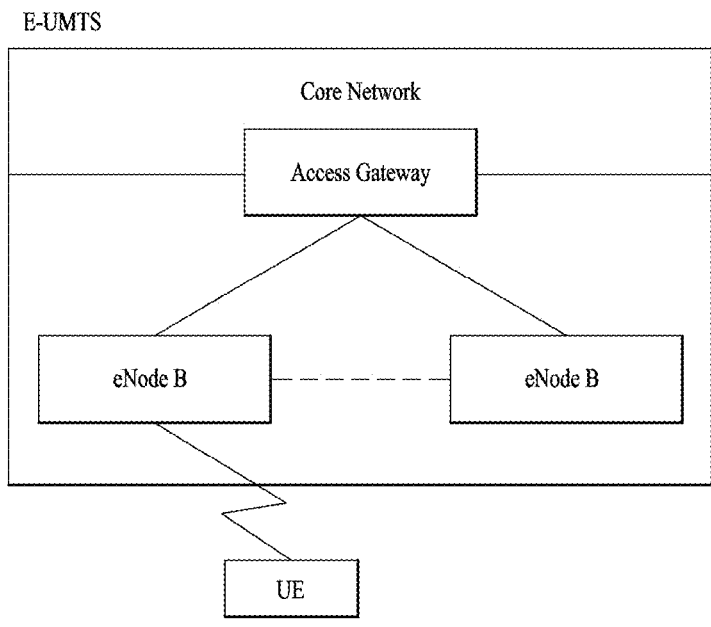
FIG. 1 is a diagram illustrating a network structure of an Evolved Universal Mobile Telecommunications System (E-UMTS) which is an example of a wireless communication system.
Figure 2:
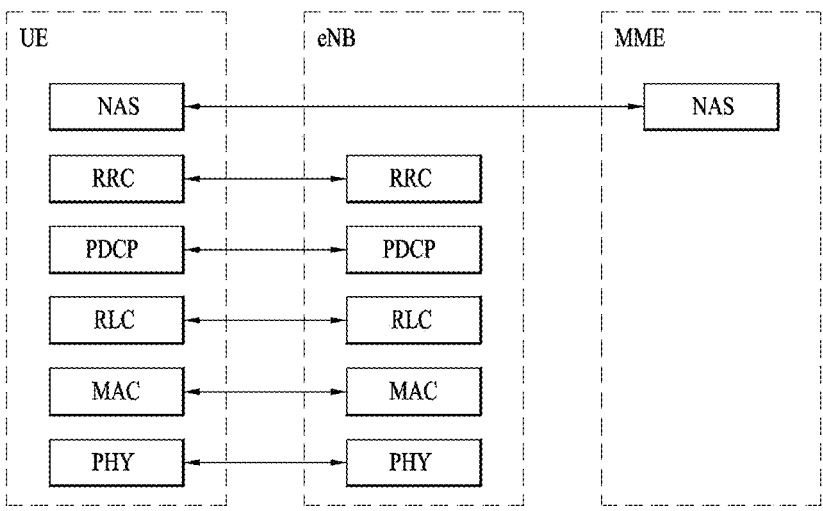
FIG. 2 is a diagram illustrating structures of a control plane and a user plane of a radio interface protocol between a user equipment and E-UTRAN based on the 3GPP radio access network standard.
Figure 2:
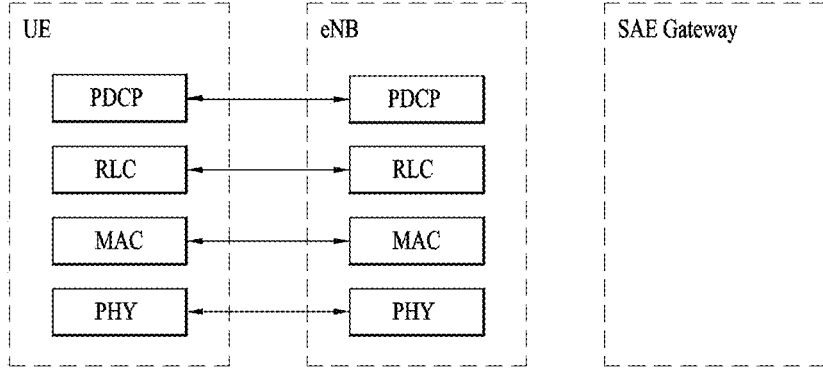

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
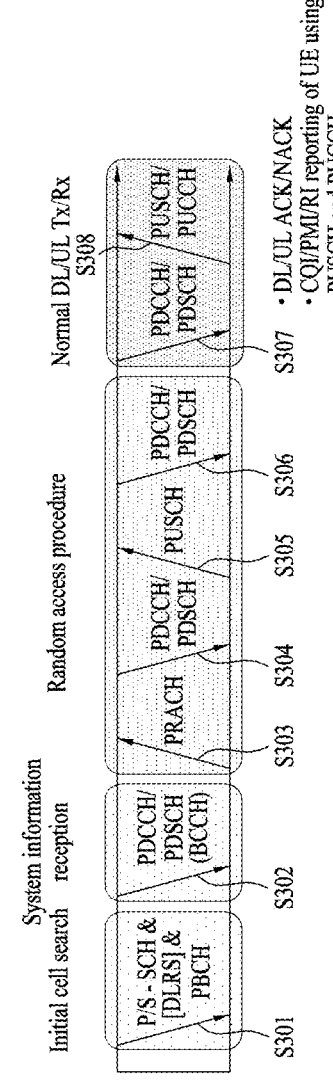
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Pre-coding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
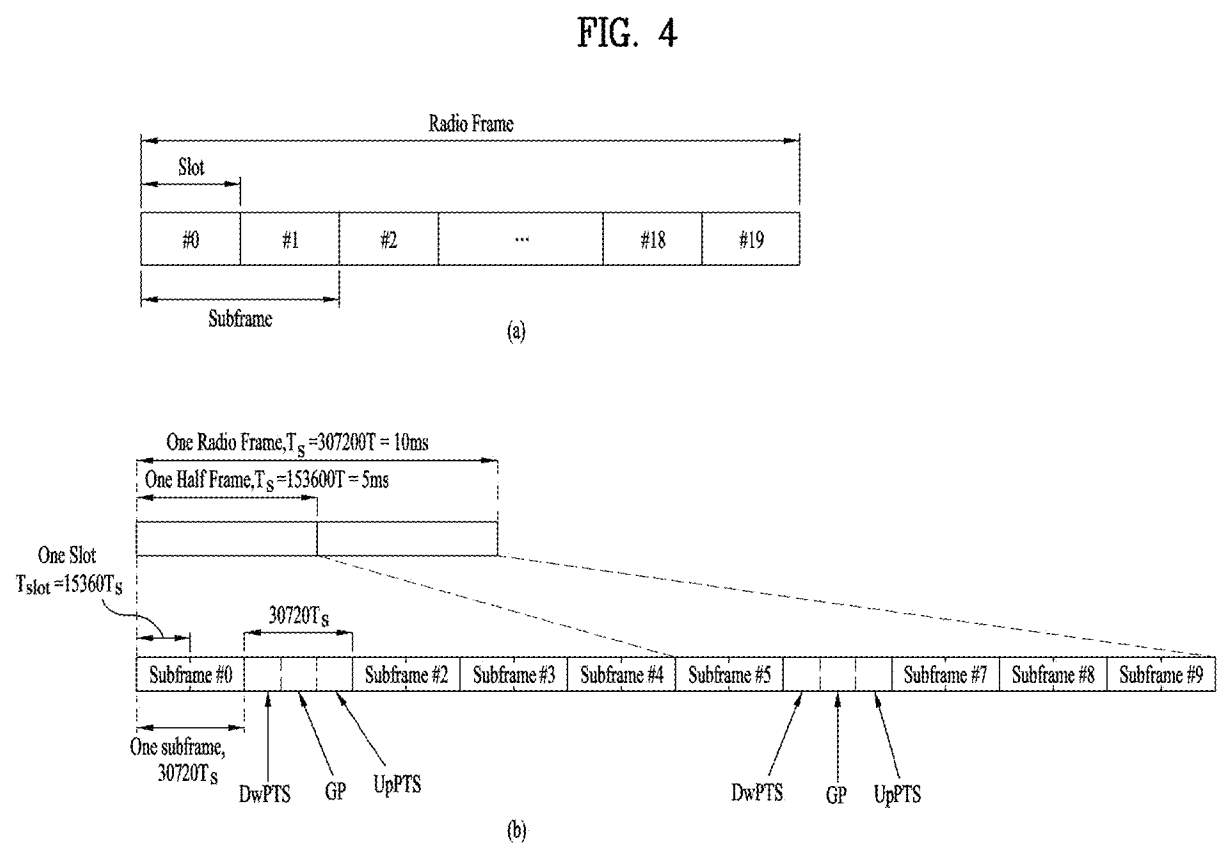

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of Ts=1/(15000×2048), and the other region is configured for the guard period.

8

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
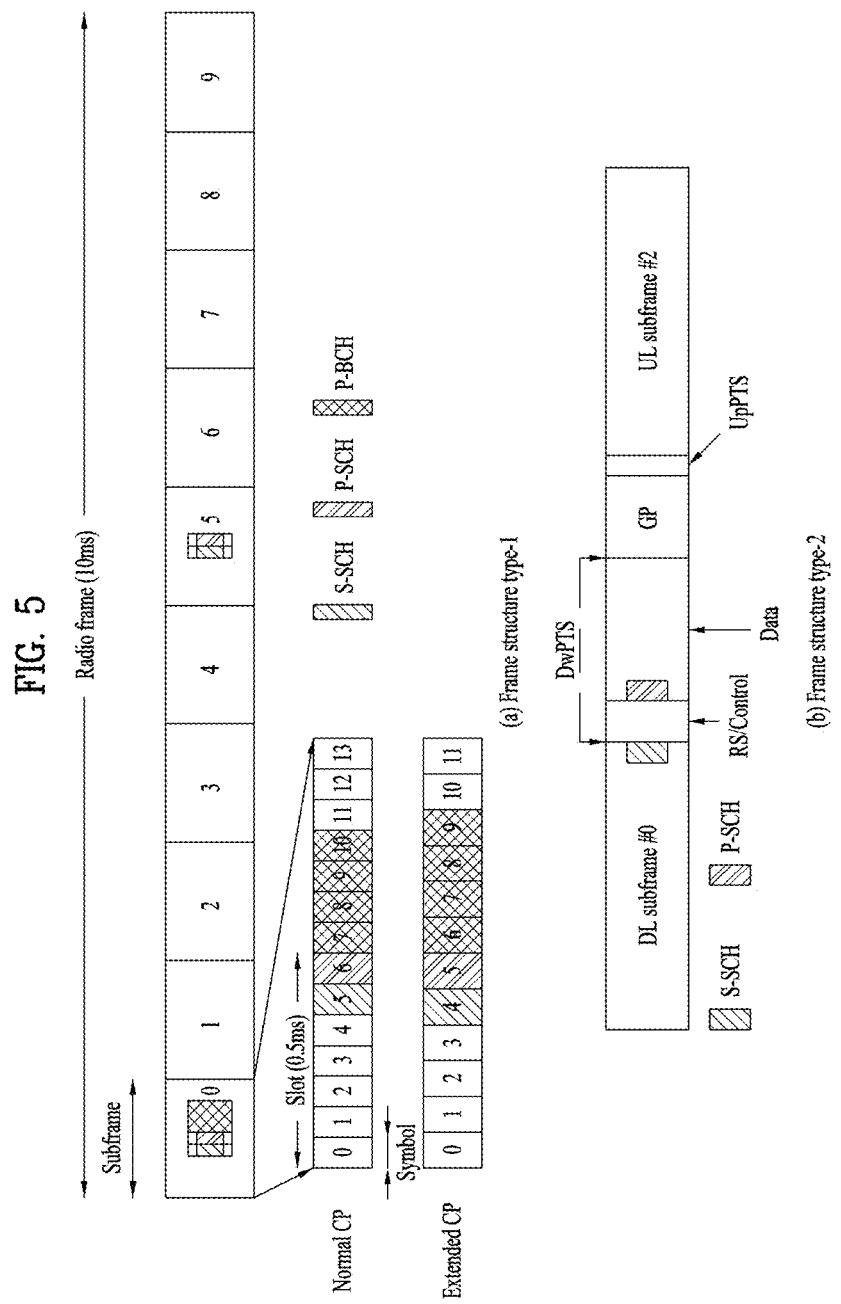
FIG. 5 is a diagram illustrating a primary broadcast channel (P-BCH) and a synchronization channel (SCH).

FIG. 5 is a diagram illustrating a primary broadcast channel (P-BCH) and a synchronization channel (SCH). The SCH includes a primary synchronization channel (P-SCH) and a secondary synchronization channel (S-SCH). The P-SCH carries a primary synchronization signal (PSS) and the S-SCH carries a secondary synchronization signal (SSS).

Referring to FIG. 5, in the frame structure type-1 (that is, FDD), the P-SCH is located at the last OFDM symbol of each of slot #0 (i.e., the first slot of subframe #0) and slot #10 (that is, the first slot of subframe #5) in every radio frame. The S-SCH is located at a previous OFDM symbol of the last OFDM symbol of each of slot #0 and slot #10 in every radio frame. The S-SCH and the P-SCH are located at neighboring OFDM symbols. In the frame structure type-2 (i.e., TDD), the P-SCH is transmitted through the third OFDM symbol of each of subframes #1 and #6 and the S-SCH is located at the last OFDM symbol of slot #1 (i.e., the second slot of subframe #0) and slot #11 (i.e., the second slot of subframe #5). The P-BCH is transmitted per four radio frames regardless of the frame structure type, and is transmitted using the first to fourth OFDM symbols of the second slot of subframe #0.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

The P-SCH is transmitted using 72 subcarriers (10 subcarriers are reserved and 62 subcarriers are used for PSS transmission) based on a DC (direct current) subcarrier within corresponding OFDM symbols. The S-SCH is transmitted using 72 subcarriers (10 subcarriers are reserved and 62 subcarriers are used for SSS transmission) based on the DC subcarrier within corresponding OFDM symbols. The P-BCH is mapped into four OFDM symbols and 72 subcarriers based on a DC subcarrier within one subframe.

Figure 6:
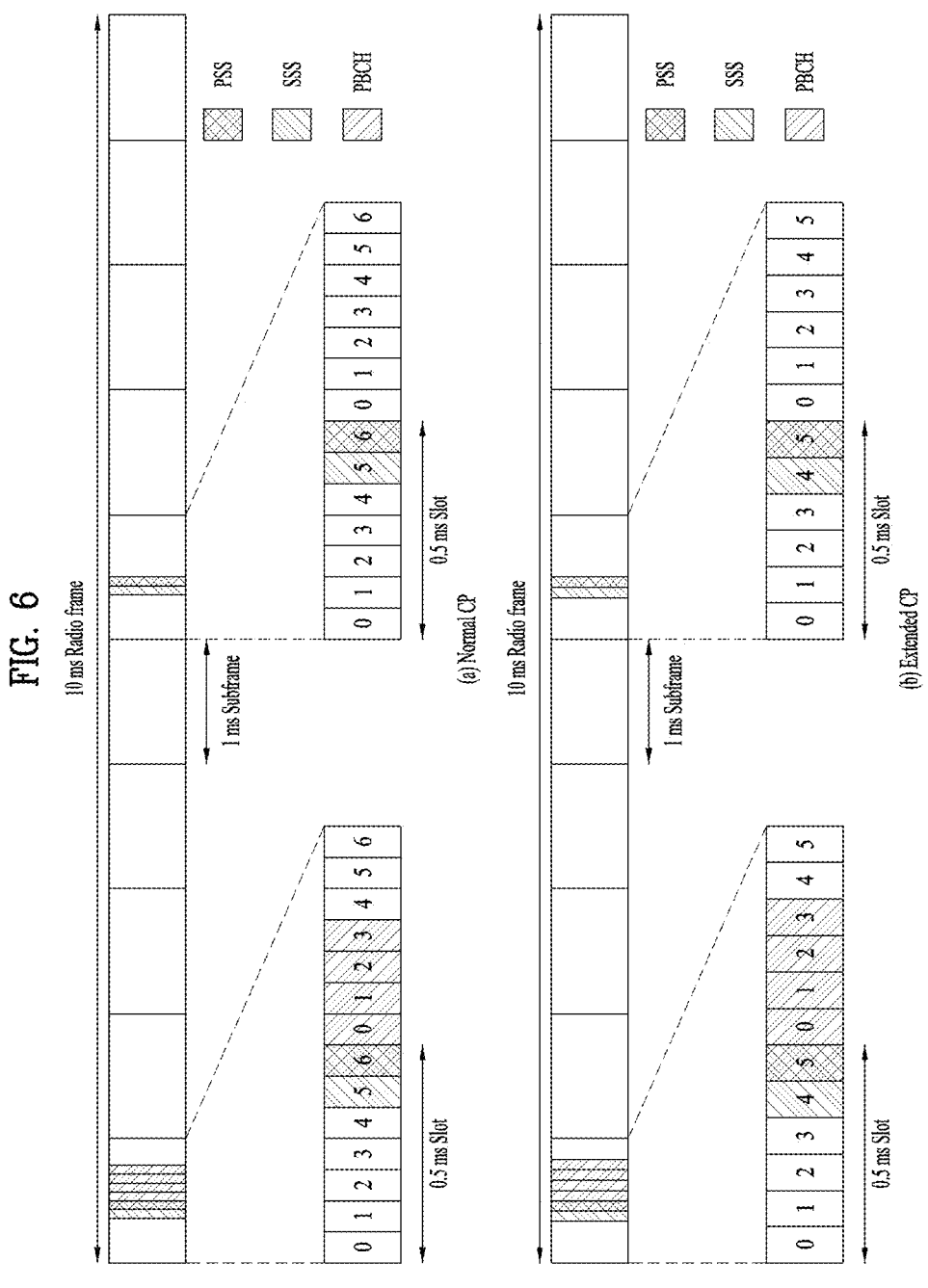
FIG. 6 illustrates a radio frame structure for transmission of a synchronization signal (SS).

FIG. 6 illustrates a radio frame structure for transmission of a synchronization signal (SS). Specifically, FIG. 6 illustrates a radio frame structure for transmission of an SS and a PBCH in frequency division duplex (FDD), wherein FIG. 6(a) illustrates transmission locations of an SS and a PBCH in a radio frame configured as a normal cyclic prefix (CP) and FIG. 6(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the CNB and obtain information such as a cell identity (ID).

An SS will be described in more detail with reference to FIG. 6. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 6, cach of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups cach including three unique IDs so that each physical layer cell ID is a part of only one physical layer cell ID group. Accordingly, a physical layer cell ID $N^{cell}_{ID}(=3N^{(1)}_{ID}+N^{(2)}_{ID})$ is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi un(n+1)}{N_{ZC}}} \qquad \text{[Equation 1]}$$

where $N_{ZC}$=63 and a sequence element corresponding to a DC subcarrier, n=31, is punctured.

The PSS is mapped to 6 RBs (=72 subcarriers) near a center frequency. Among the 72 subcarriers, 9 remaining subcarriers always carry a value of 0 and serve as elements facilitating filter design for performing synchronization. To define a total of three PSSs, u=24, 29, and 34 are used in Equation 1. Since u=24 and u=34 have a conjugate symmetry relation, two correlations may be simultaneously performed. Here, conjugate symmetry indicates the relationship of the following Equation.

$$d_u(n) = (-1)^n (d_{N_{ZC}-u}(n))^*, \text{ when } N_{ZC} \text{ is even number} \qquad \text{[Equation 2]}$$
$$d_u(n) = (d_{N_{ZC}-u}(n))^*, \text{ when } N_{ZC} \text{ is odd number}$$

A one-shot correlator for u=29 and u=34 may be implemented using the characteristics of conjugate symmetry. Computational load may be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \qquad \text{[Equation 3]}$$

Where a ZC root sequence index u is given by the following table.

TABLE 3

| $N^{(2)}_{ID}$ | Root index u |
| --- | --- |
| 0 | 25 |
| 1 | 29 |
| 2 | 34 |

Referring to FIG. 6, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Figure 7:
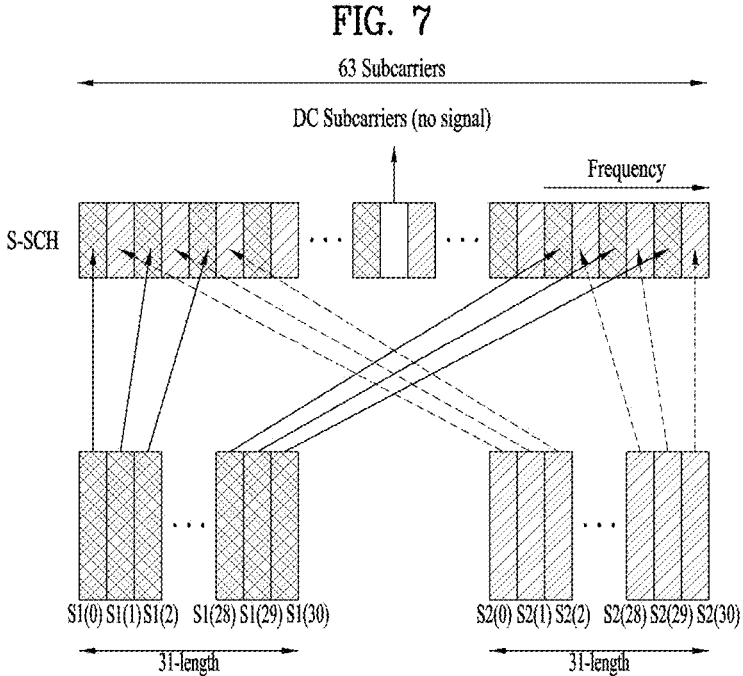
FIG. 7 illustrates a secondary synchronization signal (SSS) generation scheme.

FIG. 7 illustrates an SSS generation scheme. Specifically, FIG. 7 illustrates a relationship of mapping of two sequences in the logical domain to sequences in the physical domain.

A sequence used for the SSS is an interleaved concatenation of two length-31 m-sequences and the concatenated sequence is scrambled by a scrambling sequence given by a PSS. Here, an m-sequence is a type of a pseudo noise (PN) sequence.

Referring to FIG. 7, if two m-sequences used to generate an SSS code are S1 and S2, then S1 and S2 are obtained by scrambling two different PSS-based sequences to the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms may be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences may be transformed by high-speed m-sequence transform using fast Hadamard transform, if the m-sequences are used as the SSS, computational load necessary for a UE to interpret the SSS may be reduced. Since the SSS is configured by two short codes, computational load of the UE may be reduced.

Generation of the SSS will now be described in more detail. A sequence d(0), . . . , d(61) used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 as follows.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \le n \le 30$. Indices $m_0$ and $m_1$ are derived from a physical-layer cell-identity group $N^{(1)}{}_{ID}$ as follows.

$$m_0 = m' \bmod 31 \quad \text{[Equation 5]}$$

$$m_1 = (m_0 + \lfloor m'/31 \rfloor + 1) \bmod 31$$

$$m' = N_{ID}^{(1)} + q(q+1)/2, \; q = \left\lfloor \frac{N_{ID}^{(1)} + q'(q'+1)/2}{30} \right\rfloor, \; q' = \lfloor N_{ID}^{(1)}/30 \rfloor$$

The output of Equation 5 is listed in Table 4 that follows Equation 11.

Two sequences $s^{(m_0)}{}_0(n)$ and $s^{(m_1)}{}_1(n)$ are defined as two different cyclic shifts of an m-sequence s(n).

$$s_0^{(m_0)}(n) = s((n+m_0)\bmod 31) \quad \text{[Equation 6]}$$

$$s_1^{(m_1)}(n) = s((n+m_1)\bmod 31)$$

where s(i)=1−2x(i) ($0 \le i \le 30$) is defined by the following equation with initial conditions x(0)=(0), x(1)=0, x(2), x(3)=0, x(4)=1.

$$x(\bar{i}+5) = (x(\bar{i}+3) + x(\bar{i}))\bmod 2, \; 0 \le \bar{i} \le 25 \quad \text{[Equation 7]}$$

Two scrambling sequences $c_0(n)$ and $c_1(n)$ depend on the PSS and are defined by two different cyclic shifts of an m-sequence c(n).

$$c_0(n) = c((n + N_{ID}^{(2)})\bmod 31) \quad \text{[Equation 8]}$$

$$c_1(n) = c((n + N_{ID}^{(2)} + 3)\bmod 31)$$

where $N^{(2)}{}_{ID} \in \{0,1,2\}$ is a physical-layer identity within a physical-layer cell identity group $N^{(1)}{}_{ID}$ and c(i)=1−2x(i) ($0 \le i \le 30$) is defined by the following equation with initial conditions c(0)=0, x(1)=0, x(2), x(3)=0, x(4)=1.

$$x(\bar{i}+5) = (x(\bar{i}+3) + x(\bar{i}))\bmod 2, \; 0 \le \bar{i} \le 25 \quad \text{[Equation 9]}$$

Scrambling sequences $Z^{(m_0)1}(n)$ and $Z^{(m_1)1}(n)$ are defined by cyclic shift of an m-sequence z(n).

$$z_1^{(m_0)}(n) = z((n + (m_0 \bmod 8))\bmod 31) \quad \text{[Equation 10]}$$

$$z_1^{(m_1)}(n) = z((n + (m_1 \bmod 8))\bmod 31)$$

where $m_0$ and $m_1$ are obtained from Table 4 that follows Equation 11 and z(i)=1−2x(i) ($0 \le i \le 30$) is defined by the following equation with initial conditions x(0)=0, x(1)=0, x(2), x(3)=0, x(4)=1.

$$x(\bar{i}+5) = (x(\bar{i}+4) + x(\bar{i}+2) + x(\bar{i}+1) + x(\bar{i}))\bmod 2, \quad \text{[Equation 11]}$$
$$0 \le \bar{i} \le 25$$

TABLE 4

| $N^{(1)}{}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |

13

TABLE 4-continued

| $N^{(1)}_{ID}$ | $m_0$ | $m_1$ |
|---|---|---|
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |

14

TABLE 4-continued

| $N^{(1)}_{ID}$ | $m_0$ | $m_1$ |
|---|---|---|
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |

TABLE 4-continued

| $N^{(1)}_{ID}$ | $m_0$ | $m_1$ |
|---|---|---|
| 166 | 1 | 8 |
| 167 | 2 | 9 |
| — | — | — |
| — | — | — |

A UE, which has demodulated a DL signal by performing a cell search procedure using an SSS and determined time and frequency parameters necessary for transmitting a UL signal at an accurate time, may communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the ENB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number (SFN). Accordingly, the UE may be explicitly aware of information about the DL BW, SFN, and PHICH configuration by receiving the PBCH. Meanwhile, information which may be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are on the left and the other 3 RBs are on the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 8:
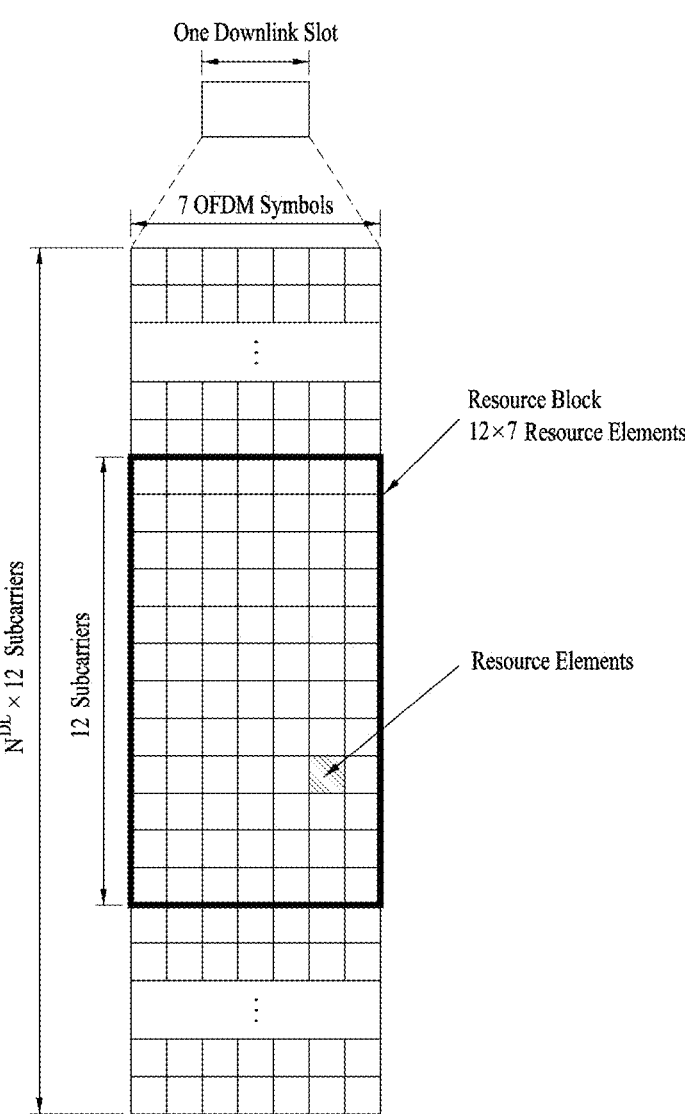
FIG. 8 illustrates a resource grid of a DL slot.

FIG. 8 illustrates a resource grid of a DL slot.

Referring to FIG. 8, a DL slot includes $$N^{DL}_{symb}$$

OFDM symbols in the time domain and $$N^{DL}_{RB}$$

RBs in the frequency domain. Each RB includes $$N^{RB}_{sc}$$

subcarriers and thus the DL slot includes $$N^{DL}_{RB} \times N^{RB}_{sc}$$

subcarriers in the frequency domain. Although FIG. 8 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE is indicated by one OFDM symbol index and one subcarrier index. One RB includes $$N^{DL}_{symb} \times N^{RB}_{sc}$$

REs. The number of RBs, $$N^{DL}_{RB},$$

included in a DL slot depends on DL bandwidth configured in a cell.

Figure 9:
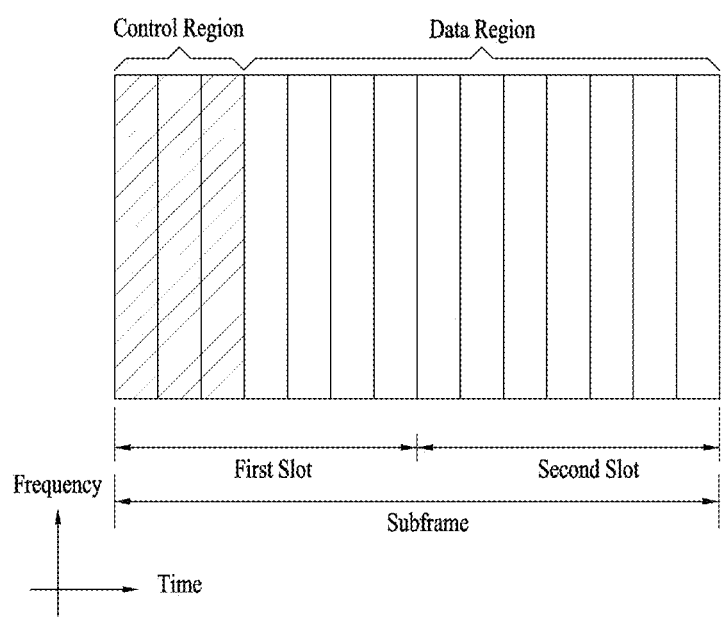
FIG. 9 illustrates the structure of a DL subframe.

FIG. 9 illustrates the structure of a DL subframe.

Referring to FIG. 9, up to three (or four) OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher layer control message such as a random access response transmitted on the PDSCH, a set of transmit power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An CNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Figure 10:
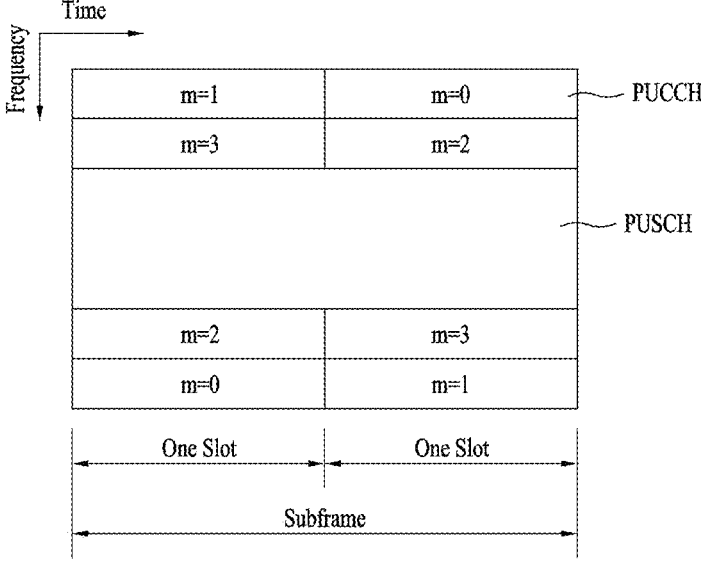
FIG. 10 illustrates the structure of a UL subframe in an LTE system.

FIG. 10 illustrates the structure of a UL subframe in an LTE system.

Referring to FIG. 10, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary. The PUCCH may deliver the following control information.

SR: SR is information requesting UL-SCH resources and is transmitted using on-off keying (OOK).

HARQ ACK/NACK: HARQ ACK/NACK is a response signal to a DL data packet received on a PDSCH, indicating whether the DL data packet has been successfully received. 1-bit ACK/NACK is transmitted as a response to a single DL codeword and 2-bit ACK/NACK is transmitted as a response to two DL codewords.

CSI: CSI is feedback information regarding a DL channel. CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except for SC-FDMA symbols allocated to RSs in a subframe are available for transmission of control information. If the subframe carries an SRS, the last SC-FDMA symbol of the subframe is also excluded in transmitting the control information. The RSS are used for coherent detection of the PUCCH.

Hereinafter, a UL RS will be described. The UL RS supports a demodulation reference signal (DM-RS) associated with PUSCH/PUCCH transmission and a sounding reference signal (SRS) not associated with PUSCH/PUCCH transmission. In this case, for the DM-RS and the SRS, the same base sequence set is used.

Generation of an RS sequence will be described first. A UL RS is defined by a cyclic shift of a base sequence according to a predetermined rule. For example, an RS sequence $$r_{u,v}^{(\alpha)}(n)$$

is defined by a cyclic sequence a of a base sequence $\bar{r}_{u,v}(n)$ according to the following equation.

$$r_{u,v}^{(\alpha)}(n) = e^{j\alpha n}\bar{r}_{u,v}(n), \quad 0 \le n < M_{sc}^{RS} \qquad \text{[Equation 12]}$$

Here, $$M_{sc}^{RS} = mN_{sc}^{RB}$$

is the length of the RS sequence and $$1 \le m \le N_{RB}^{max,UL}.$$

$N^{max,UL}_{RB}$ represented by a multiple of an integer of $N_{RBsc}$ refers to a widest UL bandwidth configuration. A plurality of RS sequences may be defined from one base sequence through different cyclic shift values a. A plurality of base sequences is defined from a DM RS and an SRS. For example, the base sequences may be defined using a root Zadoff-Chu sequence. The base sequences $\bar{r}_{u,v}(n)$ are divided into groups, each of which includes one or more base sequences. For example, each base sequence group may include one base sequence (v=0) having a length of $$M_{sc}^{RS} = mN_{sc}^{RB}(1 \le m \le 5)$$

and two base sequences each having a length of $$M_{sc}^{RS} = mN_{sc}^{RB}\left(6 \le m \le N_{RB}^{max,UL}\right).$$

In $\bar{r}_{u,v}(n)$, $u \in \{0, 1, \ldots, 29\}$ denotes a group number (i.e., group index) and v denotes a base sequence number (i.e., base sequence index) in the corresponding group. Each base sequence group number and a base sequence number in the corresponding group may vary with time.

The sequence group number u in a slot $n_s$ is defined by a group hopping pattern $f_{gh}(n_s)$ and a sequence shift pattern $f_{ss}$ according to the following equation.

$$u = (f_{gh}(n_s) + f_{ss})\bmod 30 \qquad \text{[Equation 13]}$$

A plurality of different hopping patterns (e.g., 17 hopping patterns) and a plurality of different sequence shift patterns (e.g., 30 sequence shift patterns) are present. Sequence group hopping may be enabled or disabled according to a cell-specific parameter provided by a higher layer.

The group hopping pattern $f_{gh}(n_s)$ may be given for a PUSCH and a PUCCH according to the following equation.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

[Equation 14]

Here, a pseudo-random sequence c(i) is given by Equation 15.

$$c(n) = (x_1(n + N_C) + x_2(n + N_C)) \bmod 2$$

[Equation 15]

$$x_1(n + 31) = (x_1(n + 3) + x_1(n)) \bmod 2$$

$$x_2(n + 31) = (x_2(n + 3) + x_2(n + 2) + x_2(n + 1) + x_2(n)) \bmod 2$$

A pseudo-random sequence generator is initialized with $c_{init}$ at the beginning of each radio frame according to the following equation.

$$c_{init} = \left\lfloor \frac{n_{ID}^{RS}}{30} \right\rfloor$$

[Equation 16]

According to the current 3GPP LTE(−A) standards, the hopping pattern is the same for a PUCCH and a PUSCH according to Equation 14 but the sequence shift pattern differs between the PUCCH and the PUSCH. A sequence shift pattern $f_{ss}^{PUCCH}$ for the PUCCH is provided based on a cell ID according to the following equation.

$$f_{ss}^{PUCCH} = n_{ID}^{RS} \bmod 30$$

[Equation 17]

A sequence shift pattern $f_{ss}^{PUCCH}$ for the PUSCH is given according to the following equation using the sequence shift pattern $f_{ss}^{PUCCH}$ for the PUCCH and a value $\Delta_{ss}$ configured by a higher layer.

$$f_{ss}^{PUSCH} = (N_{ID}^{cell} + \Delta_{ss}) \bmod 30$$

[Equation 18]

Here, $\Delta ss \in \{0, 1, \ldots, 29\}$.

Base sequence hopping is applied only to RSs having a length $$M_{sc}^{RS} \geq 6N_{sc}^{RB}.$$

For RSs having a length of $$M_{sc}^{RS} \geq 6N_{sc}^{RB},$$

the base sequence number v in a base sequence group is 0. For RSs having a length of $$M_{sc}^{RS} \geq 6N_{sc}^{RB},$$

the base sequence number v in a base sequence group in a slot $n_s$ is defined by Equation 19 if group hopping is disabled and sequence hopping is enabled.

$$v = \begin{cases} c(n_s) & \text{if group hopping is disabled and sequence hopping is enabled} \\ 0 & \text{otherwise} \end{cases}$$

[Equation 19]

Here, the pseudo-random sequence c(i) is given by Equation 15. The pseudo-random sequence generator is initialized with $c_{init}$ according to Equation 20 at the beginning of each radio frame.

$$c_{init} = \left\lfloor \frac{n_{ID}^{RS}}{30} \right\rfloor \cdot 2^5 + f_{ss}^{PUSCH}$$

[Equation 20]

For generation of a sequence, a method of determining a virtual cell identity (ID) will now be described. In generating the sequence, $$n_{ID}^{RS}$$

is defined according to a transmission type.

In association with PUSCH transmission, if a value for $$n_{ID}^{PUSCH}$$

is not set by higher layers or if PUSCH transmission corresponds to a random access response grant or retransmission of the same transport block as part of a contention based random access procedure, then $$n_{ID}^{RS} = N_{ID}^{cell}$$

and, otherwise, $$n_{ID}^{RS} = n_{ID}^{PUSCH}.$$

In association with PUCCH transmission, if a value for $$n_{ID}^{PUCCH}$$

is not set by higher layers, then $$n_{ID}^{RS} = N_{ID}^{cell}$$

and, otherwise, $$n_{ID}^{RS} = n_{ID}^{PUSCH}.$$

In association with SRS transmission, $$n_{ID}^{RS} = N_{ID}^{cell}.$$

In association with a DM-RS, a PUSCH RS sequence will now be described.

A PUSCH DM-RS sequence $$r_{PUSCH}^{(\lambda)}(\cdot)$$

associated with a layer $$\lambda \in \{0, 1, \dots, \upsilon - 1\}$$

may be defined by Equation 21.

$$r_{PUSCH}^{(\lambda)}\left(m \cdot M_{sc}^{RS} + n\right) = w^{(\lambda)}(m) r_{u,v}^{(\alpha_\lambda)}(n) \qquad \text{[Equation 21]}$$

$$m = 0, 1$$

where $n = 0, \dots, M_{sc}^{RS} - 1$ and $M_{sc}^{RS} = M_{sc}^{PUSCH}$.

In relation to RS sequence generation, a sequence $$r_{u,v}^{(\alpha_\lambda)}(0), \dots, r_{u,v}^{(\alpha_\lambda)}\left(M_{sc}^{RS} - 1\right)$$

is defined. An orthogonal sequence $$w^{(\lambda)}(m) \text{ is given by } [w^\lambda(0) \quad w^\lambda(1)] = [1 \quad 1]$$

for DCI format 0 if a higher layer parameter "Activate-DMRS-with OCC" is not set or if a temporary C-RNTI has been used to transmit the most recent UL-related DCI for a transport block associated with corresponding PUSCH transmission and, otherwise, the orthogonal sequence $w^{(\lambda)}$ (m) is given by Table 5 using a cyclic shift field in the most recent UL-related DCI for a transport block associated with corresponding PUSCH transmission.

TABLE 5

| Cyclic Shift Field in uplink-related | $n_{DMRS,\lambda}^{(2)}$ | | | | $[w^{(\lambda)}(0) \; w^{(\lambda)}(1)]$ | | | |
|---|---|---|---|---|---|---|---|---|
| DCI format | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A cyclic shift $\alpha_\lambda$ in a slot $n_s$ is given as $$\alpha_\lambda = 2\pi n_{cs,\lambda}/12$$

where, $$n_{cs,\lambda} = \left(n_{DMRS}^{(1)} + n_{DMRS,\lambda}^{(2)} + n_{PN}(n_s)\right) \bmod 12. \; n_{DMRS}^{(1)}$$

is given by table 6 according to a parameter cyclicShift provided by higher layers. Table 6 shows mapping of cyclicShift given by higher layers to $$n_{DMRS}^{(1)}.$$

TABLE 6

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$$n_{DMRS,\lambda}^{(2)}$$

is given by a cyclic shift for a DM-RS field in most recent UL-related DCI for a transport block associated with corresponding PUSCH transmission and a value of $$n_{DMRS,\lambda}^{(2)}$$

is given in Table 5.

The first row of Table 5 should be used to obtain $$n_{DMRS,\lambda}^{(2)} \text{ and } w^{(\lambda)}(m)$$

if there is no most recent UL-related DCI for the same transport block associated with corresponding PUSCH transmission, and i) if an initial PUSCH for the same transport block is semi-persistently scheduled or ii) if the initial PUSCH is scheduled by a random access response grant.

$n_{PN}(n_s)$ is given by Equation 22.

$$n_{PN}(n_s) = \sum_{i=0}^{7} c\left(8 N_{symb}^{UL} \cdot n_s + i\right) \cdot 2^i \qquad \text{[Equation 22]}$$

where a pseudo-random sequence c(i) is given by Equation 15. c(i) is cell-specific. A pseudo-random sequence generator is initialized with $c_{init}$. $c_{init}$ is given by Equation 23.

$$c_{init} = \left\lfloor \frac{N_{ID}^{cell}}{30} \right\rfloor \cdot 2^5 + \left( \left(N_{ID}^{cell} + \Delta_{ss}\right) \bmod 30 \right) \qquad \text{[Equation 23]}$$

where Equation 23 is applied when a value for $$N_{ID}^{csh\_DMRS}$$

is not set by higher layers or if PUSCH transmission corresponds to a random access response grant or retransmission of the same transport block as part of a contention based random access procedure and Equation 24 is applied in the other cases.

$$c_{init} = \left\lfloor \frac{N_{ID}^{csh\_DMRS}}{30} \right\rfloor \cdot 2^5 + \left(N_{ID}^{csh\_DMRS} \bmod 30\right) \qquad \text{[Equation 24]}$$

The vector of RSs is precoded according to Equation 25.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \qquad \text{[Equation 25]}$$

where P is the number of antenna ports used for PUSCH transmission.

For PUSCH transmission using a single antenna port, P=1, W=1, and 0=1 For spatial multiplexing, P=2 or P=4 and a precoding matrix W should be distinguished from a precoding matrix used for precoding of a PUSCH in the same subframe.

Hereinafter, a detailed method of performing D2D communication when D2D communication is introduced to a wireless communication system (e.g., 3GPP LTE system or 3GPP LTE-A system) will be described based on the above description.

Figure 11:
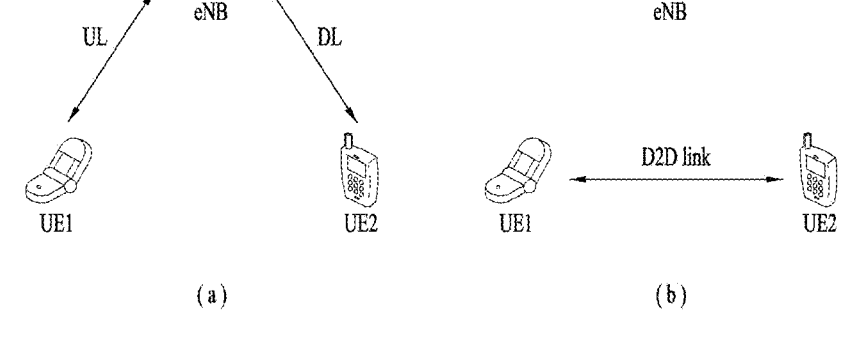
FIG. 11 is a diagram for conceptually explaining D2D communication.

FIG. 11 is a diagram for conceptually explaining D2D communication. FIG. 11(a) illustrates a conventional eNB-centered communication scheme in which a first UE UE1 may transmit data to an eNB on UL and the eNB may transmit data received from the first UE UE1 to a second UE UE2 on DL.

FIG. 11(b) illustrates a UE-to-UE communication scheme, as an example of D2D communication, in which UEs may exchange data without passing through an eNB. A link directly established between devices may be referred to as a D2D link. D2D communication has advantages of decrease in latency compared with the conventional eNB-centered communication scheme and reduction in necessary radio resources Although D2D communication supports communication between devices (or UEs) without passing through an eNB, since resources of a legacy wireless communication system (e.g., 3GPP LTE/LTE-A) are reused for D2D communication, D2D communication should not generate interference or disturbance with the legacy wireless communication system. In the same context, it is also important to minimize interference to which D2D communication is subjected by a UE and an eNB operating in the legacy wireless communication system.

The present invention proposes transmission timings of a D2D synchronization signal (D2DSS) and a physical D2D synchronization channel (PD2DSCH) transmitted by D2D transmission (Tx) UEs performing D2D communication and a method of transmitting the D2DSS and the PD2DSCH.

The D2DSS is transmitted as a predetermined signal for synchronization of D2D communication and a reception (Rx) UE detects time synchronization and frequency synchronization by blind-detecting the D2DSS. The PD2DSCH informs a UE of basic information used for D2D communication (e.g., channel bandwidth, information about a subframe in which D2D communication is performed, a resource pool for scheduling assignment (SA), and the like) and is transmitted by coding (e.g., turbo coding or convolutional coding) a data payload.

When a D2D UE detects the D2DSS, since synchronization is usually maintained for about 500 ms, a transmission period of the D2DSS may be a maximum of a few hundred ms. For convenience of description, it is assumed in the present invention that the D2DSS is transmitted at a period of 100 ms.

Figure 12:
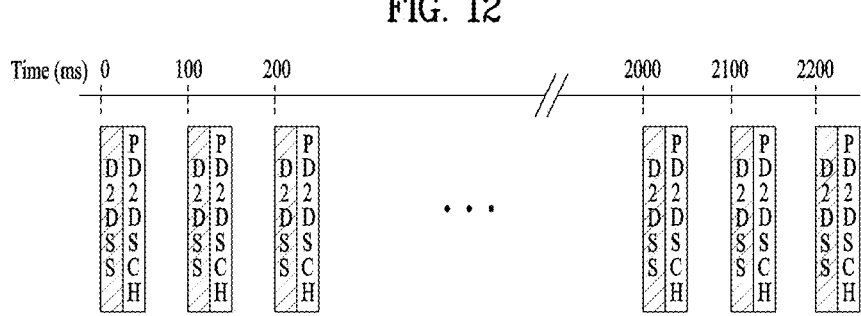
FIG. 12 is a diagram referenced to illustrate basic transmission timings of a D2DSS and a PD2DSCH.

FIG. 12 is a diagram referenced to illustrate basic transmission timings of a D2DSS and a PD2DSCH. Referring to FIG. 12, since information included in the PD2DSCH indicates infrequently varying values, the values are changed at a slow period (e.g., seconds). That is, in FIG. 12, a PD2DSCH that an Rx UE receives at t=0 ms and a PD2DSCH that the Rx UE receives at t=100 ms may be regarded as almost the same information. Therefore, the Rx UE does not need to re-receive the PD2DSCH for a predetermined time after successfully receiving the PD2DSCH.

For another reason, in order for an unspecified UE to detect the D2DSS or the PD2DSCH at an arbitrary time, a Tx UE may transmit the D2DSS or the PD2DSCH at a short period (e.g., the D2DSS or the PD2DSCH may be transmitted at a shorter period than the 100 ms illustrated in FIG. 12) and a UE (particularly, an idle mode UE) desirably performs a detection operation only for a part of the transmitted D2DSS and PD2DSCH, for the purpose of energy saving.

Accordingly, the present invention proposes a method in which the period of the PD2DSCH consists of a main period and a sub period and the PD2DSCH is repeated at the sub period within the main period (in this case, the contents of the PD2DSCH between main periods may not be changed).

For convenience of description, it will be assumed here-inbelow that a new PD2DSCH is transmitted at an interval of two seconds (2000 ms) (as in FIG. 13 which will be described later). That is, the contents of the PD2DSCH are changed at a period of two seconds. However, this assumption is purely for convenience of description and the present invention should not be limited to the above-described period. For example, the present invention may be applied in a situation in which the PD2DSCH has a period slower than the D2DSS. Therefore, after receiving the PD2DSCH, a UE may indirectly recognize a subframe number (SFN) based on the PD2DSCH.

1. Chase Combining for D2D Communication

According to an embodiment of the present invention, as a case of transmitting the PD2DSCH at a sub period, the same signal may be repeatedly retransmitted so as to cause an Rx UE to accumulate energy of the signal through chase combining.

For example, when the same transmission structure as in FIG. 12 is used, the Rx UE may accumulate energy starting from the first received PD2DSCH and stop a PD2SCH reception operation starting from a decoding success timing until the start of the next main period, thereby reducing power consumption of the UE.

While chase combining is performed, since all PD2DSCH signals are the same, it cannot be determined at which location of a main period or a sub period a signal is present. In this case, a method of determining the period of a PD2DSCH is as follows (for a frame number or a subframe number, numbering based on a legacy network may be used or a new frame or subframe number defined for D2D communication may be used).

A main period and a sub period may be predefined as specific fixed values. That is, the main period and the sub period may be determined in linkage with a frame/subframe number. (e.g., if (frame number) %100=0, then this means that a new main period is started and, if (frame number) %10=0, then this means that new sub period is started)

The main period and the sub period may be indicated by a root sequence of a D2DSS. This method is effective for an out-NW UE, a partial-NW UE, or a UE performing inter-cell D2D communication. That is, the main period and the sub period may be determined by a sequence number and a start timing of each period may be indicated by a frame number, etc. For example, if (sequence number)/4=A, then the main period and sub period may be predefined according to A or may be transmitted to a UE through higher layer signaling.

The main period and the sub period may be configured by an eNB through a higher layer signal (e.g., a D2D SIB in an RRC signal). This method may be used with respect to an in-network (in-NW) UE.

Using the above-described methods, a UE recognizes the main period and the sub period and re-detects the PD2DSCH at a period at which the PD2DSCH is reset (i.e., the main period, for example, 2 seconds (s)). In this case, a detailed operation is as follows.

A UE attempts to detect the PD2DSCH after the main period starting from a detection start timing of the PD2DSCH. In this case, the UE does not accurately detect the start of the next period and is aware of only whether the PD2DSCH is present at a corresponding timing (e.g., subframe).

A UE may be aware of a current frame number by receiving frame number information through a higher layer signal (e.g., a D2D SIB in an RRC signal) received from an eNB and may be aware of the start timing of the next main period using period information obtained through the above-described method capable of determining the period of the PD2DSCH. Therefore, the UE may monitor the PD2DSCH at the start timing of the next main period.

2. Incremental Redundancy (IR) for D2D Communication

As another embodiment for transmitting the PD2DSCH at a sub period according to the present invention, turbo coding or convolutional coding is performed using different redundancy version (RV) values, thereby raising the reception rate of an Rx UE through an incremental redundancy (IR) scheme.

Figure 13:
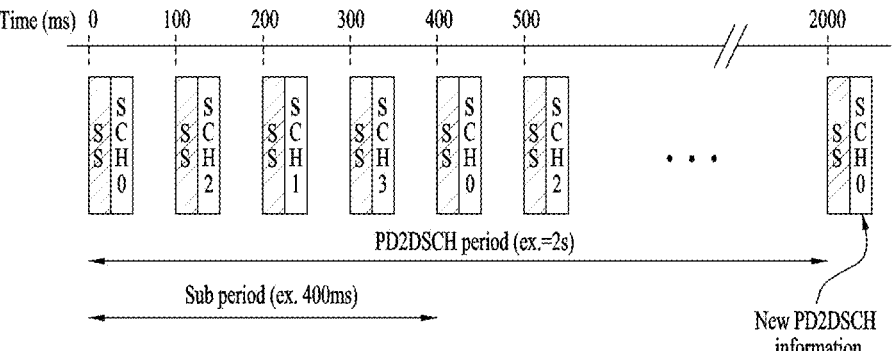
FIG. 13 is a diagram referenced to illustrate the main period and sub period of a PD2DSCH.

FIG. 13 is a diagram referenced to illustrate the main period and sub period of a PD2DSCH. Referring to FIG. 13, a total of 4 RV values is changed in order of {0,2,1,3}.

A UE may recognize a specific timing within a sub period by blind detecting the RV value of the PD2DSCH. In particular, since the structure of the PD2DSCH proposed in the present invention is self-decodable, decoding may be performed even when only one of successive PD2DSCHs is received. If a signal-to-noise ratio (SNR) is insufficient, decoding may be performed by connecting multiple PD2DSCHs.

Furthermore, the UE may perform an operation according to the PDSCH period recognition method described in "1. Chase Combining for D2D Communication" and the contents of described in the next PD2DSCH reception method. Therefore, the operation of the UE is replaced with the above description.

If frame number information is received through a higher layer signal or a D2DSS, the number of bits of the frame number information may be decreased because partial information about a frame number has been derived through an RV value.

FIG. 14 is a diagram referenced to explain a method of indicating a frame number varying with whether an RV is present according to the present invention.

Similarly, in this method (i.e., an IR scheme), a frame index may represent i) an existing radio frame index, ii) a D2D frame index or a D2D subframe index, or particularly iii) a D2D synchronization frame/subframe index out of the D2D frame. In addition, the D2D frame index may be an index which is counted independently of the existing radio frame index.

Meanwhile, when using the IR scheme, if there are too many RV values, blind decoding complexity of a UE is excessively increased. Therefore, the present invention proposes the following RV indication method.

An RV value may be accurately indicated or a set of RV values may be indicated by sequence information or a symbol location of a D2DSS.

Prior to decoding a PD2DSCH, an RV value or a set of RV values may be indicated by a sequence of a D2D DM-RS used for channel estimation or a cyclic shift (CS) of the D2D DM-RS.

In both the chase combining and IR schemes, part of a sub period may be omitted for power saving of a transmitter.

Figure 15:
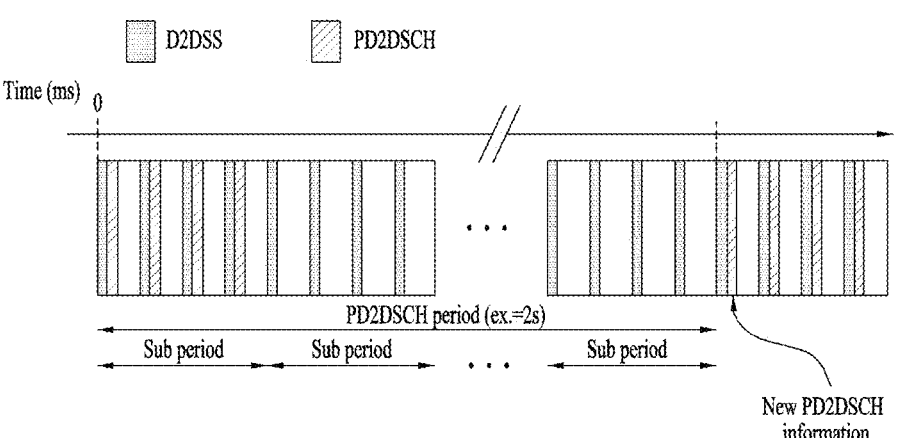
FIG. 15 is a diagram referenced to explain omission of PD2DSCH transmission in part of a sub period according to the present invention.

FIG. 15 is a diagram referenced to explain omission of PD2DSCH transmission in part of a sub period according to the present invention. In FIG. 15, a PD2DSCH is transmitted only at the first sub period and transmission of the PD2DSCH is omitted at the next sub period. Even in this case, the chase combining or IR scheme may be applied. A PD2DSCH received at an n-th period may indicate a D2D setting value of an (n+1)-th period rather than a D2D setting value of a current period. That is, a received PD2DSCH value is not applied immediately but may be applied as a changed setting value beginning from a start timing of the (n+1)-th period after a predetermined time to guarantee a combining decoding delay.

Further, in the above chase combining and IR schemes, it has been assumed that a UE receives a new PD2DSCH at every main period. However, a PD2DSCH having the same contents may be maintained during multiple main periods and, in this case, a monitoring operation of an Rx UE is not needed.

Accordingly, in the present invention, a PD2DSCH update notification signal may be additionally transmitted. That is, upon receiving the update notification signal, a UE starts to monitor a PD2DSCH at the beginning of the next main period. The update notification signal may be indicated through an additional update notification field of a paging signal of an eNB to an Rx UE in network coverage (i.e., in-NW Rx UE). Therefore, upon receiving a signal indicating D2D traffic from the eNB, a UE in a D2D idle state may be switched to an active state.

Alternatively, the PD2DSCH update notification signal may be indicated using different root sequences or symbol locations according to whether update is performed or not in a D2DSS and this method may be used with respect to both an in-NW Rx UE and an out-NW Rx UE.

A paging signal of the present invention may have a structure in which the PD2DSCH update notification field is added to an existing cellular paging signal but a D2D paging signal may be separately configured and may be transmitted at a separate period from the cellular paging signal. In this case, the D2D paging signal may indicate not only whether a PD2DSCH signal is updated but also whether a control information (CI) signal transmitted in the form of piggy-backing on a data communication channel is updated. The CI signal includes information about a new data indicator (NDI) or an RV and whether the CI signal is updated may be indicated by the paging signal. Herein, CI may mean CI used for D2D communication or a channel for CI.

Figure 16:
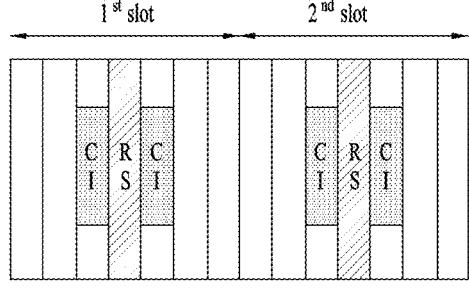
FIG. 16 illustrates control information piggybacking according to the present invention.

FIG. 16 illustrates CI piggybacking according to the present invention. In FIG. 16, it is assumed that resources except for an RS and CI are used for data communication.

Figure 17:
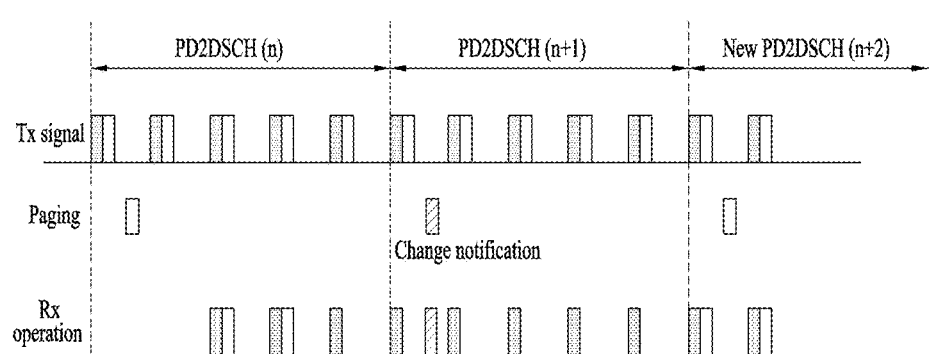
FIG. 17 is a diagram referenced to explain a PD2DSCH change notification using a paging signal.

A PD2DSCH change notification using a paging signal will now be described with reference to FIG. 17. In FIG. 17, a UE is synchronized with a D2DSS at an n-th main period and decodes two received PD2DSCHs. Next, since the UE has not received an additional paging notification, the UE continues to receive only the D2DSS and updates synchronization. However, upon receiving the change notification at an (n+1)-th main period, the UE may recognize that a new PD2DSCH is transmitted at an (n+2)-th main period and start to receive the PD2DSCH.

3. Repetition Count for D2D Communication

According to an embodiment of the present invention, a repetition count may be added as one of contents transmitted in a PD2DSCH. For example, a UE that is aware of a main period determined by higher layer signaling or a predefined main period (e.g., by the above-described methods) may be aware of at which timing the next PD2DSCH is to be detected according to a repetition count field value by decoding the PD2DSCH.

For example, if a period at which the contents of the PD2DSCH are changed is 2 seconds and if the PD2DSCH is transmitted every 100 ms, when the repetition count field is 16 as a result that the UE decodes the PD2DSCH at an arbitrary timing, the PD2DSCH may be detected after 400 ms. In this case, it may be regarded that main contents of the PD2DSCH (e.g. information except for the repetition count) are not changed up to the corresponding timing.

4. CRC Mask Setting of SS for D2D Communication

Hereinafter, a CRC mask setting method of an SS when UEs performing D2D communication perform synchronization therebetween according to the present invention will be described.

Figure 18:
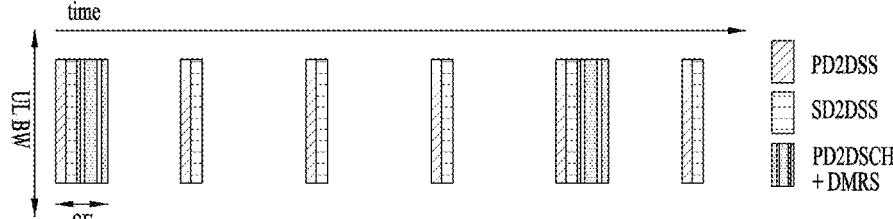
FIG. 18 and FIG. 19 are diagrams referenced to explain the base structure of an SS associated with D2D communication to which the present invention is applied.
Figure 19:
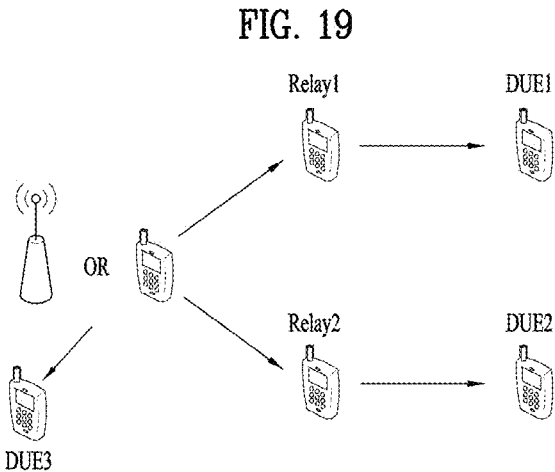

FIG. 18 and FIG. 19 are diagrams referenced to explain the base structure of an SS associated with D2D communication to which the present invention is applied. In FIG. 18, a PD2DSS denotes a primary D2D synchronization signal, an SD2DSS denotes a secondary D2D synchronization signal, and a PD2DSCH denotes a physical D2D synchronization channel. An SS for D2D communication includes the above three signals PD2DSS, SD2DSS, and PD2DSCH which have the same form as the structures of a PSS, SSS, and a PBCH in an LTE system, respectively.

Such SSs may be used in a D2D connection state as in FIG. 19. A basic connection state of a D2D synchronization procedure will now be described with reference to FIG. 19.

First, a synchronization source (SR) may be an eNB or a UE. The SR may transmit an independent SS. For example, the eNB as the SR may transmit a PSS/SSS. Therefore, a UE performing D2D communication (e.g., UE3) may receive an SS and perform D2D communication. Meanwhile, relay UEs may receive an SS of the SR and retransmit the SS to other D2D UEs.

In this case, a CRC may be attached to a data field of a PD2DSCH and the PD2DSCH may be transmitted by performing encoding using turbo or convolutional codes (e.g. turbo coding or convolutional coding). In the present invention, such a CRC may be masked to transmit specific important information. Hereinafter, for convenience of description, CRC length is exemplified as 16 bits but other values may be used for CRC length.

According to the present invention, type information of an SR (e.g., SR UE) may be indicated by a CRC mask. That is, when a plurality of SSs is received, an index indirectly indicating accuracy of synchronization may be included in the CRC mask to serve as a reference in determining priority of communication. Table 7 shows an example in which information about an SR type is included in the CRC mask. In addition, even when a UE transmits a D2DSS/PD2DSCH, the SR type may differ according to whether the UE is in eNB coverage or out of eNB coverage. This is because an ultimate SR is an eNB when the UE is in eNB coverage. Accordingly, in the above description, if the SR type is the eNB, this may mean that the UE transmitting the D2DSS/PD2DSCH is in eNB coverage. That is, whether the UE transmitting the D2DSS/PD2DSCH is in eNB coverage or out of eNB coverage may be distinguished through the CRC mask.

TABLE 7

| SR type | CRC mask |
|---|---|
| eNB | 0x0000 |
| Out-NW UE | 0xFFFF |

According to the present invention, the CRC mask may indicate a stratum level. That is, the CRC mask may indicate how many times a received SS is retransmitted. Generally, a synchronization error is accumulated as a relaying operation is performed. To avoid this phenomenon, it is desirable to limit the number of times of relaying of an SS.

For example, when the stratum level is defined as in Table 8, if a stratum level is 0, this means that the SS is directly transmitted by an SR UE and, if the stratum level is 1, this means that the SS is a signal which is relayed once, i.e., the SS is transmitted by a relay (e.g., Relay1 or Relay2) in FIG. 19.

TABLE 8

| Stratum level | CRC mask |
|---|---|
| 0 | 0x0000 |
| 1 | 0xFFFF |
| 2 | 0x1111 |

In the example of Table 8, it is assumed that a maximum value of the stratum level is 2. The stratum level of 2 may mean that the SS is no longer relayed.

Meanwhile, a D2DSS of an eNB is an LTE PSS/SSS not including a PD2DSCH. That is, the stratum level of 0 will be always used only by an out-NW SR UE. Therefore, since accuracy of the SS may be indirectly recognized, the CRC mask may be a reference for determining priority when multiple SSs are detected.

According to the present invention, the CRC mask may indicate a transmission type. That is, whether the transmission type is unicast, groupcast, or broadcast may be indicated through the CRC mask. Therefore, UEs that desire to receive broadcast information may decode the PD2DSCH using a mask corresponding to broadcast and, if decoding is successful, the UEs may perform the next operation (e.g., discovery signal reception) and, if the UEs fail to perform decoding, the UEs may detect another broadcast signal.

According to the present invention, the CRC mask may indicate a PD2DSCH format indicator. Information necessary for a UE may differ according to i) whether the UE is in-NW or out-NW, ii) unicast, groupcast, or broadcast type of D2D communication, or iii) other reasons or it may be desirable to receive some information from an eNB (rather than a UE performing D2D communication). For example, in a situation in which a UE is in a network (i.e., in-NW), it is desirable that the eNB directly designate all resource pools directly in terms of entire resource scheduling.

Therefore, the UE may receive an in-NW resource pool field from the eNB through a higher layer signal (e.g., RRC) and delete a PD2DSCH resource pool field. Instead, another field value may be repeated or a reserved field may be further secured. That is, in various situations, a type of information included in the PD2DSCH may vary and the CRC mask may be used to indicate the information type.

Figure 20:
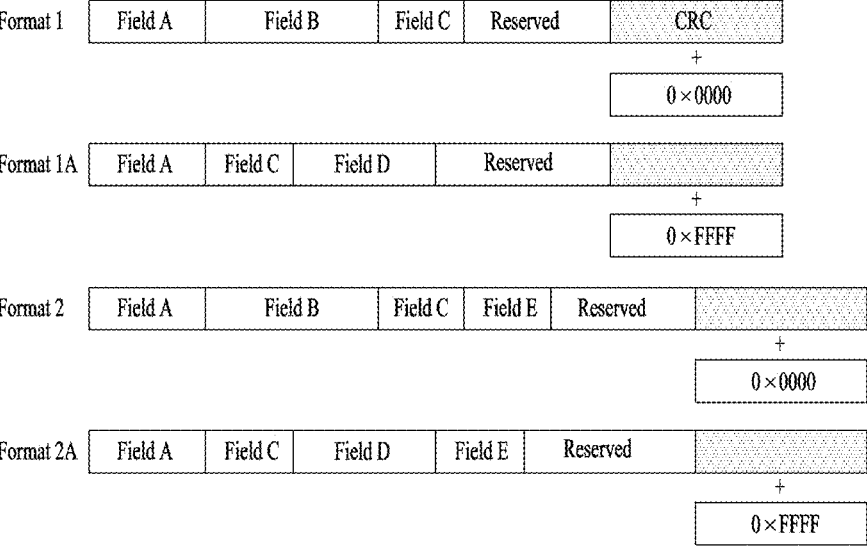
FIG. 20 is a diagram referenced to explain the case in which a CRC mask is used as a PD2DSCH format indicator according to the present invention.

FIG. 20 is a diagram referenced to explain the case in which a CRC mask is used as a PD2DSCH format indicator according to the present invention.

As indicated in FIG. 20, assuming that different formats of PD2DSCHs are transmitted, Field D may be omitted in Formats 1 and 2 and Field B may be omitted in Formats 1A and 2A.

Therefore, a D2D Rx UE receiving a PD2DSCH may blind decode the PD2DSCH to two length types of Format 1/1A and Format 2/2A and perform CRC using two CRC demasking types (0x0000 and 0xFFFF), thereby recognizing the PD2DSCH as a successful format. While two length types are exemplarily blind detected to clarify description, this is purely an additional element and the present invention is applicable to only one length (i.e., only a CRC mask is checked).

In addition, the CRC mask according to the present invention may indicate a synchronization reference ID. That is, each synchronization reference may include an ID to distinguish from other references. Hereinafter, the ID for distinguishing between synchronization references will be referred to as a synchronization reference ID.

For example, UEs, such as Relay1 and Relay2 of FIG. 19, that relay a D2DSS of another UE, may use the same synchronization reference as the UE that has originally transmitted the D2DSS and, therefore, have the same synchronization reference ID.

Generally, a sequence of a D2DSS is generated from a synchronization reference ID (e.g., a sort of a virtual cell ID having the same structure as an existing LTE cell ID). If a CRC of a PD2DSCH is generated from the synchronization reference ID, a UE may confirm whether the synchronization reference ID derived from detection of the D2DSS has been actually transmitted. In addition, if an SR ID differs according to the above-described SR type, the SR ID may be used for CRC making so that the SR type may be considered for CRC masking. For example, an even-numbered SR ID may be interpreted as the case in which an eNB is an SR and an odd-numbered SR ID may be interpreted as the case in which a UE is an SR. The even-numbered SR ID may be interpreted as an ID when a UE located in an eNB transmits the D2DSS and the odd-numbered SR ID may be interpreted as an ID when a UE out of an eNB transmits the D2DSS. Similarly, if an SR ID of a predetermined region is used by a UE that transmits the D2DSS according to an instruction of an eNB and an SR ID of other regions is used by a UE out of coverage without an instruction of the eNB, when a CRC mask is derived through the SR ID, a UE receiving the PD2DSCH may recognize, through the CRC mask, in which situation of a UE the D2DSS is transmitted.

The CRC mask according to the present invention may be used to indicate a CP length. That is, a UE performing D2D communication using the same synchronization reference needs to adjust the CP length. In this case, instead of additional signaling through the PD2DSCH, the CP length may be indicated through the CRC mask.

The CRC mask according to the present invention may also be used to indicate a synchronization resource index. Namely, multiple synchronization resources may be used by a UE to transmit the D2DSS. For example, if a period of the D2DSS transmitted by one UE is given as 40 ms, a plurality of synchronization resources is present in one period of 40 ms and one UE in one period may transmit the D2DSS on one synchronization resource and receive a D2DSS transmitted by another UE on another synchronization resource.

Therefore, when a UE receives a specific D2DSS and PD2DSCH, an index of a synchronization resource may be indicated through the CRC mask of the PD2DSCH in order to determine the location of a synchronization resource on which a corresponding signal is received within a period of the D2DSS.

Figures 21, 22:
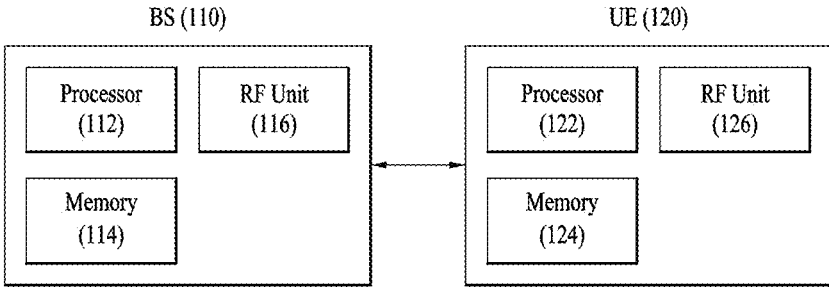
FIG. 21 is a diagram referenced to explain the case in which an index of a synchronization resource is indicated through a CRC mask according to the present invention.
FIG. 22 illustrates a BS and a UE that are applicable to an embodiment of the present invention.

FIG. 21 is a diagram referenced to explain the case in which an index of a synchronization resource is indicated through a CRC mask according to the present invention. In FIG. 21, two synchronization resources are adjacent to each other in one D2DSS period and the other time resources are used to transmit and receive a D2D signal and a cellular signal. In this case, if a specific UE receives a D2DSS/PD2DSCH on a specific synchronization resource, the UE should be aware of an index of the corresponding signal to identify the location of another synchronization resource, thereby performing D2D transmission and reception, For example, the specific UE receives the D2DSS/PD2DSCH on the specific synchronization resource, identifies an index of the signal, and transmits a D2DSS on a synchronization resource different from the identified specific synchronization resource, thereby avoiding collision with the D2DSS received thereby.

That is, in FIG. 21, upon receiving the D2DSS/PD2DSCH on the specific synchronization resource, if the UE is aware that an index of the corresponding synchronization resource is 0 through the CRC mask, the UE may recognize that another synchronization resource having an index of 1 is present immediately after the specific synchronization resource. Alternatively, if the index of the specific synchronization resource is 1, the UE may recognize that another synchronization resource having an index of 0 is present immediately prior to the specific synchronization resource.

In this way, the operation indicating the synchronization resource index using the CRC mask is similar to the operation indicating the above-described stratum level. In the case of general synchronization relaying described in FIG. 19, since a UE of a specific stratum level should receive a D2DSS of a previous level, synchronization resources of different stratum levels should be distinguished in the time domain. Accordingly, in synchronization relaying using a stratum level, a predetermined linkage may be present between a synchronization resource index and a stratum level. In this case, the operation of indicating the synchronization resource index through the CRC mask may be identical to the operation indicating the stratum level. However, the stratum level may not be signaled according to a specific form of a D2D synchronization operation. In particular, for a UE moving at a high speed, since the stratum level is continuously changed, use of the stratum level may cause frequent synchronization change, thereby deteriorating overall performance. Thus, even if the stratum level is not used, since an individual UE should receive a D2DSS of another UE while transmitting a D2DSS, synchronization resources still need to be distinguished in the time domain and, in this case, the synchronization resource index needs to be indicated to enable the above-described operation.

In performing CRC masking for a PD2DSCH, it is possible to generate a final bit string to be used for CRC masking by combining at least two of the above-described SR (e.g., SR UE) type, stratum level, transmission type, PD2DSCH format indicator, synchronization reference ID, CP length, and synchronization resource index.

Meanwhile, the above-described information is used not only for CRC masking but also for generation of i) a sequence of scrambling a data bit of a PD2DSCH or ii) a sequence of an RS of demodulating the PD2DSCH, thereby enabling transmission of the information to a UE using wider variety of methods. That is, the above-described information is used to generate various sequences for transmission of the PD2DSCH and is transmitted to an Rx UE.

According to the above description, a receiver may restore an original bit value by performing decoding (convolutional decoding or turbo decoding) and then use a corresponding information value when there are no errors as a result of checking a mask value and CRC through CRC blind decoding.

5. DM-RS Transmission Method for D2D Communication

Hereinafter, a method including the above-described information in a DM-RS associated with a synchronization channel for D2D communication will be described in more detail.

As described above, there are several elements for determining a DM-RS of a PUSCH but the most basically used element is $$n_{ID}^{RS}$$

corresponding to a cell ID (or a virtual cell ID which is set by a network independently of the cell ID).

Therefore, in D2D communication according to the present invention, a DM-RS may be generated by replacing an $$n_{ID}^{RS}$$

field with information to be transmitted. For example, the DM-RS may be generated by inserting a synchronization reference ID into the cell ID.

Meanwhile, the region of the synchronization reference ID is wide, whereas only up to 30 base sequences of a PUSCH DM-RS are generated. Even if the DM-RS is generated by inserting the synchronization reference ID into the place of the cell ID, D2DSSs/PD2DSCHs of different synchronization reference IDs may be frequently transmitted on the same resource as the same DM-RS. In particular, in a state in which an Rx UE does not recognize a frame number or a subframe number, since it is impossible to perform sequence hopping using the frame number or the subframe number, the above-described restriction becomes severer. In this case, the problem may be relieved by generating a DM-RS generation parameter, for example, a DM-RS cyclic shift and/or an orthogonal cover code (OCC), using a synchronization reference ID.

For example, the OCC may be determined using partial lower bits of the synchronization reference ID, the DM-RS cyclic shift may be determined using partial lower bits among the other bits except for the bits used for the OCC, and a sequence group number may be determined by replacing the place of a base sequence generation parameter $$n_{ID}^{RS}$$

or directly, using bits other than the bits used for the OCC and the DM-RS cyclic shift. For example, the OCC may be determined using one lower bit of the synchronization reference ID as indicated by Equation 26.

$$\begin{cases} [+1 \ +1] & \text{if } n_{ID}^{D2DSS}\text{mod}2 = 0 \\ [+1 \ -1] & \text{if } n_{ID}^{D2DSS}\text{mod}2 = 1 \end{cases}, \qquad \text{[Equation 26]}$$

The cyclic shift (CS) may be determined as Equation 27 by modifying an equation of a PUSCH DM-RS CS using three lower bits of the synchronization reference ID.

$$n_{DMRS}^{(1)} = 0, \ n_{DMRS}^{(2)} = \left\lfloor n_D^{D2DSS}/2 \right\rfloor \text{mod}8 \qquad \text{[Equation 27]}$$

A base sequence may be determined as Equation 28 by modifying an equation of a PUSCH DM-RS base sequence directly using the synchronization reference ID.

$$n_{ID}^{RS} = n_{ID}^{D2DSS}, \ f_{ss}^{PSSCH} = n_{ID}^{D2DSS}\text{mod}30. \qquad \text{[Equation 28]}$$

In Equation 28, $$n_{ID}^{D2DSS}$$

is the synchronization reference ID. Alternatively, since the OCC has been determined through the lowest synchronization reference ID, the base sequence may be set such that $$n_{ID}^{RS} = \left\lfloor n_D^{D2DSS}/2 \right\rfloor, \ f_{ss}^{PSSCH} = \left\lfloor n_D^{D2DSS}/2 \right\rfloor \text{mod}30.$$

In addition, since at least one of the CS and the OCC is set to the four lower bits of the synchronization reference ID, the base sequence may be set such that $$n_{ID}^{RS} = \left\lfloor n_D^{D2DSS}/2^4 \right\rfloor, \ f_{ss}^{PSSCH} = \left\lfloor n_D^{D2DSS}/2^4 \right\rfloor \text{mod}30.$$

Conversely, the base sequence may be determined using lower bits of the synchronization reference ID and the CS/OCC may be determined using the other higher bits.

Since a synchronization resource index corresponds to information about time, the synchronization resource index may replace a subframe index (or slot index) corresponding to a time resource index in generating a DM-RS. For example, if two synchronization resources are present in one D2DSS period, slot indexes on the first synchronization resource may be set to 0 and 1 and slot indexes on the second synchronization resource may be set to 2 and 3.

Hereinafter, scrambling of a PD2DSCH will be described. Currently, an initial value of scrambling related to a PUSCH in LTE is set as indicated in Equation 29.

$$c_{init} = n_{PNTI} \cdot 2^{14} + q \cdot 2^{13} + \lfloor n_s/2 \rfloor \cdot 2^9 + N_{ID}^{cell} \qquad \text{[Equation 29]}$$

where $n_{RNTI}$ is a value indicated by higher layer signaling, q is a codeword index, $\lfloor n_s/2 \rfloor$ denotes a subframe number of data, and $$N_{ID}^{cell}$$

is a cell ID. In the present invention, Equation 29 may be changed to methods 29-1 to 29-7 to determine the initial value of scrambling of the PD2DSCH.

29-1: In Equation 29, $n_{RNTI}$ may be fixed to '0'.

29-2: In Equation 29, $$N_{ID}^{cell}$$

may be fixed to '510' or '511'.

29-3: In Equation 29, $$N_{ID}^{cell}$$

may be set to a synchronization reference ID.

29-4: In Equation 29, $n_{RNTI}$ may be set to a synchronization reference ID.

29-5: In Equation 29, $n_{RNTI}$ may be fixed to '510' or '511'.

29-6: In Equation 29, $n_S$ may be set to '0'.

29-7: In Equation 29, $n_S$ may be determined by a subframe number or a slot number in which a D2DSS is transmitted.

If method 29-2, 29-4, or 29-6 is used for scrambling according to the present invention, then $$c_{init} = n_D^{D2DSS} \cdot 2^{14} + 510 \text{ or } c_{init} = n_D^{D2DSS} \cdot 2^{14} + 511.$$

Since there is one codeword index in D2D communication, q is assumed to be 0. In this case, $$n_{ID}^{D2DSS}$$

is a synchronization reference ID.

If method 29-3, 29-5, or 29-6 is used for scrambling according to the present invention, then $$c_{init} = 510 \cdot 2^{14} + n_D^{D2DSS} \text{ or } c_{init} = 511 \cdot 2^{14} + n_D^{D2DSS}.$$

Since there is one codeword in D2D communication, q is assumed to be 0. In this case, $$n_{ID}^{D2DSS}$$

is a synchronization reference ID.

Meanwhile, in the case of D2DSSue_net, there may be D2DSSue_net transmitted by an in-coverage UE based on a timing of an eNB as a reference and D2DSSue_net transmitted by an out-coverage UE based on D2DSSue_net transmitted by the in-coverage UE as a timing reference. In this case, an indicator (e.g., 1-bit indicator) indicating whether a UE that transmits D2DSSue_net is in coverage or out of coverage may be transmitted in a PD2DSCH.

In this case, even when D2DSSue_net has the same synchronization ID, it is necessary to differently configure scrambling and a DM-RS according to the state of a Tx UE (in-coverage/out-coverage) because the contents of the PD2DSCH are changed by the 1-bit indicator. Therefore, the present invention proposes that a PD2DSCH and/or a DM-RS for decoding the PD2DSCH be differently set by the 1-bit indicator.

For example, for the DM-RS, an OCC part may be determined by the 1-bit indicator. Then, $$n_{DMRS}^{(2)}$$

may be set to $$n_{ID}^{D2DSS} \bmod 8.$$

In addition, $$n_{DMRS}^{(1)}$$

may be determined by the 1-bit indicator. For DM-RS reconfiguration, $$n_{ID}^{D2DSS}$$

may be differently set by the 1-bit indicator. For example, if the 1-bit indicator is 0, $$n_{ID}^{D2DSS}$$

may be used and, if the 1-bit indicator is 1, $$n_{ID}^{D2DSS}$$

may be set to $$n_{ID}^{D2DSS} + X$$

(where X may be a preset value or a predetermined value linked with $$n_{ID}^{D2DSS}).$$

For a scrambling sequence, methods 29-8 to 29-11 to which the 1-bit indicator is applied may be additionally considered.

29-8: In Equation 29, q is differently set according to the 1-bit indicator.

29-9: In Equation 29, $n_{RNTI}$ may be differently set according to the 1-bit indicator. For example, an in-coverage UE may use 510 as $n_{RNTI}$ and an out-coverage UE may use 511 as $n_{RNTI}$.

29-10:

$$N_{ID}^{cell}$$

may be differently set according to the 1-bit indicator. For example, an in-coverage UE may use 510 as $$N_{ID}^{cell}$$

and an out-coverage UE may use 511 as $N_{ID}^{cell}$.

29-11: $n_S$ may be differently set according to the 1-bit indicator. For example, an in-coverage UE may use 0 as $n_S$ and an out-coverage UE may use another specific value other than 0 as $n_S$.

FIG. 22 illustrates a BS and a UE that are applicable to an embodiment of the present invention. If a wireless communication system includes a relay, communication in a backhaul link is performed between the BS and the relay and communication in an access link is performed between the relay and the UE. Accordingly, the BS or the UE shown in FIG. 13 may be replaced with the relay according to situation.

Referring to FIG. 22, a wireless communication system includes a BS 110 and a UE 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method of transmitting and receiving an SS for D2D communication in a wireless communication system and the apparatus therefor have been described centering on an example applied to a 3GPP LTE system, the present invention is applicable to a variety of wireless communication systems in addition to the 3GPP LTE system.

What is claimed is:

1. A method of transmitting a signal by a user equipment (UE) via a communication between the UE and another UE, the method comprising:
  generating a plurality of bits for a physical channel;
  generating a demodulation reference signal (DM-RS) related to the physical channel, based on an orthogonal code, a cyclic shift, and a sequence; and
  transmitting the physical channel and the DM-RS,
  wherein each of the orthogonal code, the cyclic shift, and the sequence is determined based on a synchronization identity.

2. The method according to claim 1, wherein the plurality of bits for the physical channel is scrambled based on synchronization identity.

3. The method according to claim 1, wherein the physical channel is a physical broadcast channel.

4. The method according to claim 1, wherein the orthogonal code is determined based on a first part related with some lower bits of the synchronization identity,
  wherein the cyclic shift is determined based on a second part of the synchronization identity, which is related with remaining lower bits except for the first part among bits of the synchronization identity, and wherein the sequence is determined based on a third part related with remaining bits except for the first and second parts among the bits of the synchronization identity.

5. The method according to claim 4, wherein the first part is one least significant bit of the synchronization identity, and
  wherein the second part is remaining three lower bits except for the one least significant bit among four lower bits of the synchronization identity.

6. The method according to claim 1, wherein the orthogonal code is determined based on a modulo 2 operation performed upon the synchronization identity, and
  wherein the cyclic shift is determined by applying a modulo 8 operation to a floor function of a value obtained by dividing the synchronization identity by 2.

7. A user equipment (UE) in a communication between the UE and another UE, the UE comprising:
  at least one transceiver;
  at least one processor; and
  at least one memory storing instructions that, when executed, cause the at least one processor to perform operations comprising:
  generating a plurality of bits for a physical channel;
  generating a demodulation reference signal (DM-RS) related to the physical channel, based on an orthogonal code, a cyclic shift, and a sequence; and
  transmitting the physical channel and the DM-RS,
  wherein each of the orthogonal code, the cyclic shift, and the sequence is determined based on a synchronization identity.

8. The UE according to claim 7, wherein the plurality of bits for the physical channel is scrambled based on the synchronization identity.

9. The UE according to claim 7, wherein the physical channel is a physical broadcast channel.

10. The UE according to claim 7, wherein the orthogonal code is determined based on a first part related with some lower bits of the synchronization identity,
  wherein the cyclic shift is determined based on a second part of the synchronization identity, which is related with remaining lower bits except for the first part among bits of the synchronization identity, and
  wherein the sequence is determined based on a third part related with remaining bits except for the first and second parts among the bits of the synchronization identity.

11. The UE according to claim 10, wherein the first part is one least significant bit of the synchronization identity, and
  wherein the second part is remaining three lower bits except for the one least significant bit among four lower bits of the synchronization identity.

12. The UE according to claim 7, wherein the orthogonal code is determined based on a modulo 2 operation performed upon the synchronization identity, and
  wherein the cyclic shift is determined by applying a modulo 8 operation to a floor function of a value obtained by dividing the synchronization identity by 2.

13. A method of receiving a signal by a user equipment (UE) via a communication between the UE and another UE, the method comprising:
  receiving a physical channel and a demodulation reference signal (DM-RS) related to the physical channel; and
  obtaining a plurality of bits based on the physical channel;

wherein the DM-RS is determined based on an orthogonal code, a cyclic shift, and a sequence; and wherein each of the orthogonal code, the cyclic shift, and the sequence is determined based on a synchronization identity.

14. The method according to claim 13, wherein the physical channel is a physical broadcast channel.

15. The method according to claim 13, wherein the orthogonal code is determined based on a first part related with some lower bits of the synchronization identity, wherein the cyclic shift is determined based on a second part of the synchronization identity, which is related with remaining lower bits except for the first part among bits of the synchronization identity, and wherein the sequence is determined based on a third part related with remaining bits except for the first and second parts among the bits of the synchronization identity.

16. The method according to claim 15, wherein the first part is one least significant bit of the synchronization identity, and wherein the second part is remaining three lower bits except for the one least significant bit among four lower bits of the synchronization identity.

17. The method according to claim 13, wherein the orthogonal code is determined based on a modulo 2 operation performed upon the synchronization identity, and wherein the cyclic shift is determined by applying a modulo 8 operation to a floor function of a value obtained by dividing the synchronization identity by 2.

* * * * *